May 14, 1935. C. LAUGIER 2,001,466
FUEL CHARGE HEATING MEANS FOR AUTOMOTIVE VEHICLES
Filed March 8, 1933
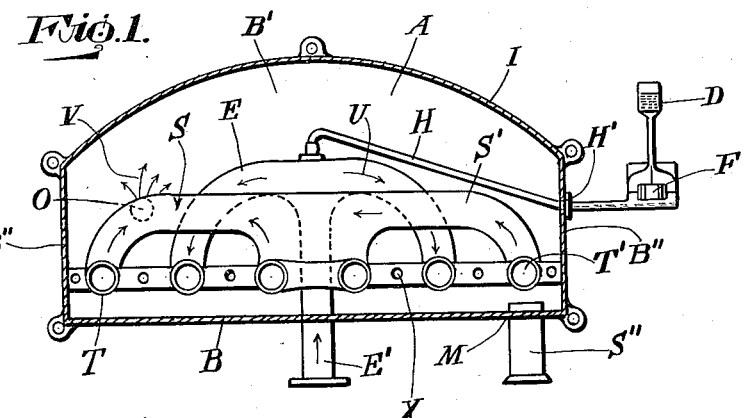
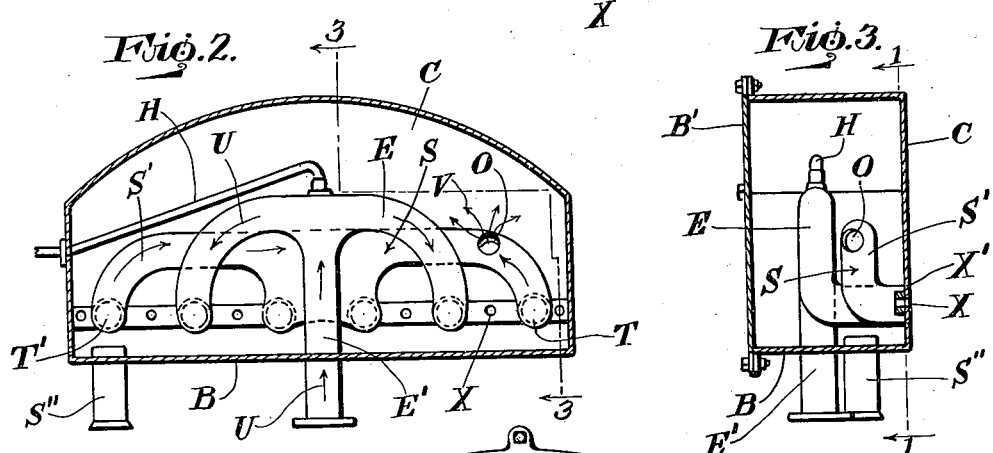
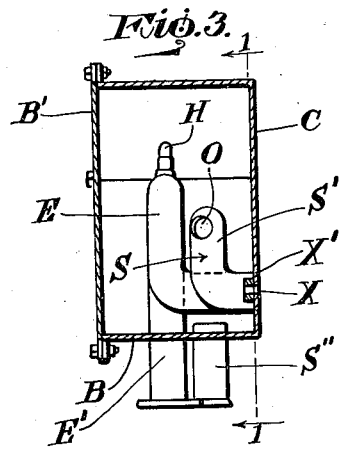
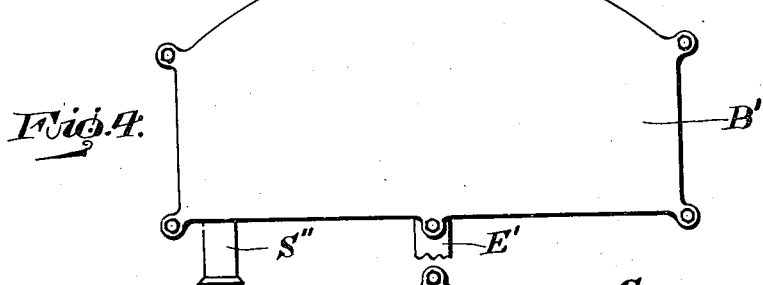
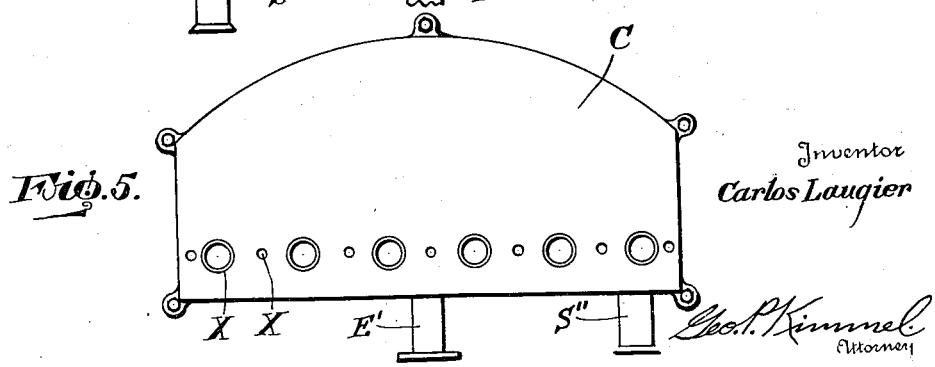
Inventor
Carlos Laugier Patented May 14, 1935

2,001,466

UNITED STATES PATENT OFFICE 2,001,466

FUEL CHARGE HEATING MEANS FOR AUTOMOTIVE VEHICLES

Carlos Laugier, Mexico, D. F., Mexico, assignor of thirty per cent to Marcos Odriozola and thirty per cent to Thomas Reyes Retana, both of Mexico, D. F., Mexico Application March 8, 1933, Serial No. 660,060 In Mexico July 22, 1932

4 Claims. (Cl. 123—122)

This invention relates to a fuel charge heating means for automotive vehicles, and has for its object to provide for the efficient operation of a motor of the internal combustion type from a fuel heavier and of less expansive power than that of gasoline thereby resulting in a material saving of fuel costs.

A further object of the invention is to provide, in a manner as hereinafter set forth, a fuel charge heating means constructed and arranged for utilizing directly the exhaust from a motor of the internal combustion type, prior to the discharge of the exhaust into the atmosphere to increase the expansive power of a fuel heavier than gasoline subsequently supplied to the combustion space of the motor whereby the heated heavy fuel will provide for the efficient operation of the motor at a material saving in fuel costs with respect to that of gasoline or other lighter fuels.

A further object of the invention is to provide, in a manner as hereinafter set forth, a fuel charge heating means arranged at and coacting with the intake and exhaust manifolds of the motor for heating a fuel charge heavier than gasoline prior to the supplying of such fuel to the combustible space of the motor, whereby the expansive power of the heavier fuel is materially enhanced to provide for an efficient operation of the motor.

Further objects of the invention are to provide, in a manner as hereinafter set forth, a fuel charge heating means for the purpose referred to, which is comparatively simple in its construction and arrangement, strong, durable, compact, readily installed with respect to a motor or engine of the internal combustion type, thoroughly efficient in its use, and comparatively inexpensive to manufacture.

To the above ends essentially and to others which may hereinafter appear, the invention consists of such parts, and such combination of parts which fall within the scope of the invention as claimed.

In the drawing:

Figure 1 is a longitudinal sectional view of the fuel charge heating means on line I—I, Figure 3, looking towards the front wall of the housing thereof, Figure 2 is a longitudinal sectional view of the fuel charge heating means looking towards the rear wall of the housing thereof.

Figure 3 is a vertical section of the fuel charge heating means on line 3—3, Figure 2, Figure 4 is a front elevation of the fuel charge heating means, and Figure 5 is a rear elevation of the said means.

The adaptation of a fuel charge heating means, in accordance with this invention, is illustrated by way of example to be installed with an internal combustion motor of the four cylinder type.

The fuel charge heating means includes a closed housing I consisting of a series of detachably connected parts providing the bottom, top, sides, front and rear thereof. The housing I forms a heat chamber A in which is arranged the intake and exhaust manifolds E and S for the cylinders (not shown) of the motor (not shown). The rear wall C of housing I is formed with openings X for the passage of holdfast devices to anchor housing I to the motor cylinders and also with openings X' for the passage of the branches of the manifolds. The intake manifold E has a vertical part E' which extends through and depends from the bottom B of housing I and is adapted to be coupled with the carbureter (not shown) of the motor. The exhaust manifold S includes a tubular part S' which is common to and communicates with the exhaust of the cylinders of the motor. The said part S' at one end T is closed to chamber A and is in permanent communication with the exhaust of one outer motor cylinder of the bank of cylinders. The other end of part S' is closed as at T', but is in permanent communication with the exhaust of the other outer motor cylinder of the bank of cylinders.

The part S' is formed with an opening O for the discharge therefrom of the products of combustion from the cylinders directly into the chamber A to act upon the intake manifold E to heat the heavy fuel charge flowing towards the combustion chambers of the motor cylinders for the purpose of increasing the expansive power of such fuel. The direction of travel of the fuel charge is indicated by the arrows U. The directions of travel of the products of combustion from the motor cylinders are indicated by the arrows V.

The bottom B of housing I is formed below the closed end T' with an opening M which communicates with a conducting off pipe S" whereby the products of combustion supplied directly to chamber A will be discharged from the latter, but not before such products have acted to heat the intake manifold E to enhance the expansive power of the fuel charge which is supplied from the carbureter to the part E' of the intake manifold.

As the front wall B' of housing I is detachably connected in closure position, it may be readily disconnected so access may be had to the interior of chamber A.

As shown in Figure 1, the fuel charge heating means is shown as having attached therewith a humidifier device H leading from a water supply D and including a float operated controlling element F. The intake manifold E is formed with an opening E'' centrally of its top for the purpose of receiving the inner end of the humidifier device H whereby communication is established between the latter and intake manifold E. The use of the humidifier device H provides for the combining of steam with the charge of heavy fuel, thus increasing the expansive power of the fuel. The device H extends through an opening H' in one of the side walls B'' of housing H.

The manner of setting up the fuel charge heating means in the manner as referred to retards the discharge of the hot products of combustion supplied directly to chamber A which quickly raises the temperature in the latter, whereby the heating of the charge of heavy fuel is had to the extent to materially enhance the expansive force of the charge resulting in an efficient operation of the motor at a materially less expense than would be the case if the fuel charge employed was gasoline.

What I claim is:—

1. The combination of the intake and exhaust manifolds of an internal combustion motor operated from a low burning fuel, a structure enclosing said manifolds and providing a heat chamber, said exhaust manifold being closed at its discharge end and formed with an opening remote from said end for discharging the products of combustion received from the motor directly into said chamber for heating the fuel charge passing through said intake manifold to enhance the expansive power of said charge, and said structure being provided with means at a point remote from said opening for the discharge of the products of combustion from the heat chamber.

2. The combination of the intake and exhaust manifolds of an internal combustion motor operated from a low burning fuel, a structure enclosing said manifolds and providing a heat chamber, said exhaust manifold being closed at its discharge end and formed with an opening remote from said end for discharging the products of combustion received from the motor directly into said chamber for heating the fuel charge passing through said intake manifold to enhance the expansive power of said charge, said structure being provided with means at a point remote from said opening for the discharge of the products of combustion from the heat chamber, and the said means being located below said discharge end.

3. The combination of the intake and exhaust manifolds of an internal combustion motor operated from a low burning fuel, a structure enclosing said manifolds and providing a heat chamber, said exhaust manifold being closed at its discharge end and formed with an opening remote from said end for discharging the products of combustion received from the motor directly into said chamber for heating the fuel charge passing through said intake manifold to enhance the expansive power of said charge, said structure being provided with means at a point remote from said opening for the discharge of the products of combustion from the heat chamber, and said structure and intake manifold being formed with means for respectively supporting and establishing communication between said hydrator device and said intake manifold.

4. The combination of the intake and exhaust manifolds of an internal combustion motor, a structure for anchoring to the cylinders of the motor and forming a heat chamber enclosing said manifolds, said exhaust manifold having its discharge end arranged in said chamber and closed, said exhaust manifold being formed with an opening located within said chamber at one side of the latter for discharging the products of combustion received from the motor directly into said chamber for heating the fuel charge passing through the intake manifold to increase the expansive power of said chamber, and said structure being formed with means located at the other side of said chamber and below said opening for the discharge of the products of combustion from said chamber.

CARLOS LAUGIER.